US006913068B2

(12) United States Patent
Togawa et al.

(10) Patent No.: US 6,913,068 B2
(45) Date of Patent: Jul. 5, 2005

(54) ENGINE EXHAUST HEAT RECOVERING APPARATUS

(75) Inventors: Kazuhiro Togawa, Saitama (JP); Kazuhito Takemura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 211 days.

(21) Appl. No.: 10/115,256

(22) Filed: Apr. 4, 2002

(65) Prior Publication Data

US 2002/0153127 A1 Oct. 24, 2002

(30) Foreign Application Priority Data

Apr. 20, 2001 (JP) ..................... P2001-122669

(51) Int. Cl.$^7$ ............................... F02G 5/04
(52) U.S. Cl. ................. 165/51; 165/47; 165/916; 165/921; 123/41.33; 123/196 AB; 60/614; 60/616; 60/618; 60/648; 60/267
(58) Field of Search .................. 165/47, 51, 916, 165/921; 123/196 AB, 41.33; 60/618, 614, 616, 648, 267

(56) References Cited

U.S. PATENT DOCUMENTS

| 5,000,003 | A | | 3/1991 | Wicks |
| 5,351,487 | A | * | 10/1994 | Abdelmalek ............ 60/618 |
| 6,305,170 | B1 | * | 10/2001 | Kitani et al. .............. 60/614 |
| 6,324,849 | B1 | * | 12/2001 | Togawa et al. ............ 60/616 |
| 6,367,260 | B1 | * | 4/2002 | Kasai et al. ............... 60/648 |
| 6,435,420 | B1 | * | 8/2002 | Kasai et al. ............... 60/648 |

FOREIGN PATENT DOCUMENTS

| DE | 30 32 090 A1 | | 4/1982 |
| DE | 36 22 631 A1 | | 1/1988 |
| DE | 41 11 298 A1 | | 10/1992 |
| DE | 195 38 067 A1 | | 4/1997 |
| EP | 0 952 406 A2 | | 10/1999 |
| EP | 1251261 A2 | * | 10/2002 |
| JP | 1-296047 | * | 11/1989 |
| JP | 2-104954 | * | 4/1990 |
| JP | 3-260315 | | 11/1991 |
| JP | 4-5461 | * | 1/1992 |
| JP | 4-10302 | * | 2/1992 |
| JP | 8-4586 | | 1/1996 |
| JP | 2001-132564 | | 5/2001 |
| JP | 2001-132565 | | 5/2001 |

OTHER PUBLICATIONS

Derwent Acc No. 1997– 066807, DE 29513957, first Figure (Jan 9, 1997).*

* cited by examiner

*Primary Examiner*—John K. Ford
(74) *Attorney, Agent, or Firm*—Westerman, Hattori, Daniels & Adrian, LLP

(57) ABSTRACT

A circulating path 12 is provided for circulating a heat transfer medium across the cooling section 6A and an exhaust heat exchanger 9. The circulating path 12 is communicated to an output heat exchanger which is mounted on a hot water storage. The heat transfer medium is circulated by a pump 10 from the exhaust heat exchanger 9 to the oil heat exchanger 5 and the cooling section 6A. The heat transfer medium to be introduced into the exhaust heat exchanger 9 is so controlled in the flow rate that a temperature of the water vapor in the exhaust gas is declined to a temperature lower than the dew point. The heat transfer medium when having received heat directly from the exhaust gas and heat generated by condensation of the exhaust heat is conveyed to the cooling section 6A where its temperature soars up further.

4 Claims, 6 Drawing Sheets

ENGINE EXHAUST HEAT RECOVERING APPARATUS

BACKGROUND OF THE INVENTION

1. Field of the Invention

The present invention relates to an apparatus for recovering exhaust heat from an engine and particularly, an engine exhaust heat recovering apparatus for used as a power source in a cogeneration system.

2. Description of the Related Art

As a variety of attempts for protection of the global environment have been proposed, energy friendly systems such as cogeneration systems for recovering the generated heat for reuse are now focused in view of the efficient usage of energy. Such a cogeneration system has an exhaust gas released at a higher temperature than that of its engine. Therefore, in the cogeneration system, a heat recovering medium (typically an engine cooling water) is introduced into the cooling section of the engine to receive the heat from an exhaust gas and then transferred to the heat exchanger where it releases the heat (See JP Patent No. 2691372 and JP Patent Laid-open Publication (Heisei)8-4586).

FIG. 5 is a diagram showing changes in the temperature of the heat recovering medium (referred to as a heat transfer medium hereinafter) and the exhaust gas in a conventional waste heat recovering apparatus where the vertical axis represents the temperature and the horizontal axis represents flow direction of the heat transfer medium and the exhaust gas. The temperature of the heat transfer medium varies as is denoted by a characteristic curve Lm while the temperature of the exhaust gas in the exhaust gas heat exchanger is denoted by the curves Lga (in parallel-flow mode) and Lgb (in counter-flow mode). The directions of the exhaust gas flow in the parallel-flow mode and the counter-flow mode are expressed by pf and cf, respectively.

The heat transfer medium recovers heat from the engine while running through the engine cooling unit, hence increasing its temperature from p' to q'. As the heat transfer medium passes through the exhaust gas heat exchanger, it recovers heat from the exhaust gas and its temperature is increased from q' to r'. Simultaneously, the exhaust gas is deprived of its heat by the heat transfer medium decreases its temperature from g' to approximately r'. As the exhaust gas heat exchanger is disposed at the downstream with the engine cooling unit disposed at the upstream of the circulation path of the heat transfer medium, the heat transfer medium is exposed to the exhaust gas of a higher temperature than that of the engine in the exhaust gas heat exchanger, hence increasing a temperature difference $\Delta t$ before and after recovering the waste heat (cf. the temperature difference $\Delta t$ being slightly greater in the counter-flow mode than in the parallel-flow mode)

The recovered thermal quantity is proportional to a product of the temperature difference $\Delta t$ of the heat transfer medium between the entrance and the exit of the waste heat recovering apparatus and the flow of the heat transfer medium. Accordingly, the smaller the flow, the greater the temperature difference $\Delta t$ (or the recovered thermal energy) of the heat transfer medium becomes as shown in FIG. 5. If the flow of the heat transfer medium is great, the temperature difference will be declined.

FIG. 6 illustrates a temperature change of the heat transfer medium of which the flow is greater than that shown in FIG. 5. The temperature of the heat transfer medium varies as is denoted by a curve Lm1 when its temperature level at the entrance of the exhaust gas heat exchanger is lower than the dew point W of the exhaust gas. It varies as is denoted by a curve Lm2 when the temperature of the heat transfer medium is higher than the dew point W. The temperature of the exhaust gas is changed as indicated with lines Lg1 and Lg2 in both the cases. For simplicity of the description, the two cases are implemented in the parallel-flow mode.

The heat transfer medium introduced to the engine with its temperature a" lower than the dew point W of the exhaust gas recovers heat from the engine, then its temperature increases to c". Furthermore, as the heat transfer medium is passed through the exhaust gas heat exchanger, its temperature is increased in two steps. When the exhaust gas is deprived of its heat by the heat transfer medium, its temperature rapidly drops down from g. On the other hand, the heat transfer medium recovers heat from the exhaust gas and its temperature increases up to b" when the temperature of the exhaust gas drops down to the dew point W. As the exhaust gas reaches the dew point W, its contents (mainly water vapor contained in the exhaust gas) are condensed thus generating a condensation heat. The condensation heat is also absorbed by the heat transfer medium of which the temperature in turn rises up to f". Finally, the thermal energy bringing about a temperature difference $\Delta t1$ can be recovered.

Alternatively, the heat transfer medium having a temperature p" higher than the dew point W of the exhaust gas and being introduced to the engine recovers heat from the engine, then its temperature increases to q". Furthermore, as the heat transfer medium is passed through the exhaust gas heat exchanger, its temperature is increased to r". As a result of the heat recovering just mentioned, a temperature difference $\Delta t2$ can be recovered.

As clearly understood with the comparison between FIGS. 5 and 6, the conventional waste heat recovering apparatus when using a large amount of the heat transfer medium for heat energy recovery possibly limits the temperature difference of the heat transfer medium between before and after recovering the waste heat to a smaller level than with the use of a smaller amount of the heat transfer medium. It may be possible to increase the temperature of the heat transfer medium due to a heat of condensation of the contents of the exhaust gas when the initial temperature of the heat transfer medium is lower than the dew point W of the exhaust gas. However, the temperature of the heat transfer medium is duly increased by heat transfer from the engine cooling unit before the heat transfer medium arrives at the entrance of the exhaust gas heat exchanger. This causes the temperature of the heat transfer medium to hardly stay lower than the dew point W. It will hence take a significant length of time before the exhaust gas temperature drops down to the dew point W, thus rarely permitting the transfer of the condensation heat at a higher efficiency. If the temperature of the exhaust gas is quickly decreased to the dew point W, more portions of the condensation heat energy may be transferred to the heat transfer medium. This issue has not yet been overcome.

SUMMARY OF THE INVENTION

The present invention has been developed in view of the above aspects and its object is to provide an engine waste heat recovering apparatus which can more effectively recover the condensation heat of exhaust gas contents generated in an exhaust gas heat exchanger.

The first feature of this invention includes an oil heat exchanger for heat exchange between the engine oil in the engine and the heat transfer medium, and a heat transfer medium circulating path for conveying the heat transfer medium to the exhaust heat exchanger where the heat transfer medium receives heat from the exhaust gas so that a temperature of the water vapor in the exhaust gas is declined to a temperature lower than the dew point, passing the heat transfer medium through the oil heat exchanger, and transferring the heat transfer medium to the cooling section of the engine where the heat transfer medium receives heat from an engine cooling medium, in an engine exhaust heat recovering apparatus for providing a heat output through a heat transfer medium circulated by the action of a water pump across a cooling section of the engine and an exhaust heat exchanger which heat source is provided with the heat generated in the exhaust gas of the engine.

The second feature of this invention is that the heat transfer medium is predetermined in the temperature and/or the flow rate to have a temperature of the water vapor in the exhaust gas maintained at a temperature lower than the dew point through the heat exchange in the exhaust heat exchanger during the operation.

The third feature of this invention is that the heat transfer medium is predetermined in the temperature and/or the flow rate to have a temperature of the water vapor in the exhaust gas maintained at a temperature lower than the dew point through the heat exchange in the exhaust heat exchanger during a predetermined length of time in the operation.

The fourth feature of this invention is the construction where the heat transfer medium is further transferred from the heat transfer medium circulating path to an output heat exchanger where heat is released from the heat transfer medium.

The fifth feature of this invention is the construction where the water pump is disposed on the inlet side of the exhaust heat exchanger.

According to the first to fifth features, a temperature of the water vapor in the exhaust gas is declined to a temperature smaller than the dew point through heat exchange with the heat transfer medium introduced into the exhaust heat exchanger. As the heat transfer medium is transferred to the cooling section provided at the downstream of the circulating path after receiving the heat from the exhaust gas and the heat generated by condensation of the exhaust gas, its temperature soars up further. The heat transfer medium receiving more heat is then circulated to the output heat exchanger.

In particular, there is provided a passage for conveying the heat transfer medium from the exhaust heat exchanger to another heat exchanger. This allows the heat transfer medium to receive heat from the exhaust gas when its temperature remains sufficiently low. More particularly, the latent heat generated by the condensation of the exhaust gas can most favorably be recovered by the heat transfer medium.

According to the third feature, a temperature of the water vapor in the exhaust gas can be held at a temperature lower than the dew point throughout the heat recovering operation. According to the fourth feature, the heat recovering operation includes a duration of time at a predetermined ratio for holding the water vapor at a temperature lower than the dew point in the exhaust heat exchanger.

According to the fifth feature, the water pump is disposed where the temperature of the heat transfer medium stays low. As the heat transfer medium is passed though the water pump before receiving heat from the engine, its direct contact with any component of the water pump can be avoided when heated at a higher temperature, hence minimizing the degradation of the components such as seals of the water pump.

DETAILED DESCRIPTION OF THE PREFERRED EMBODIMENTS

Figure 1:
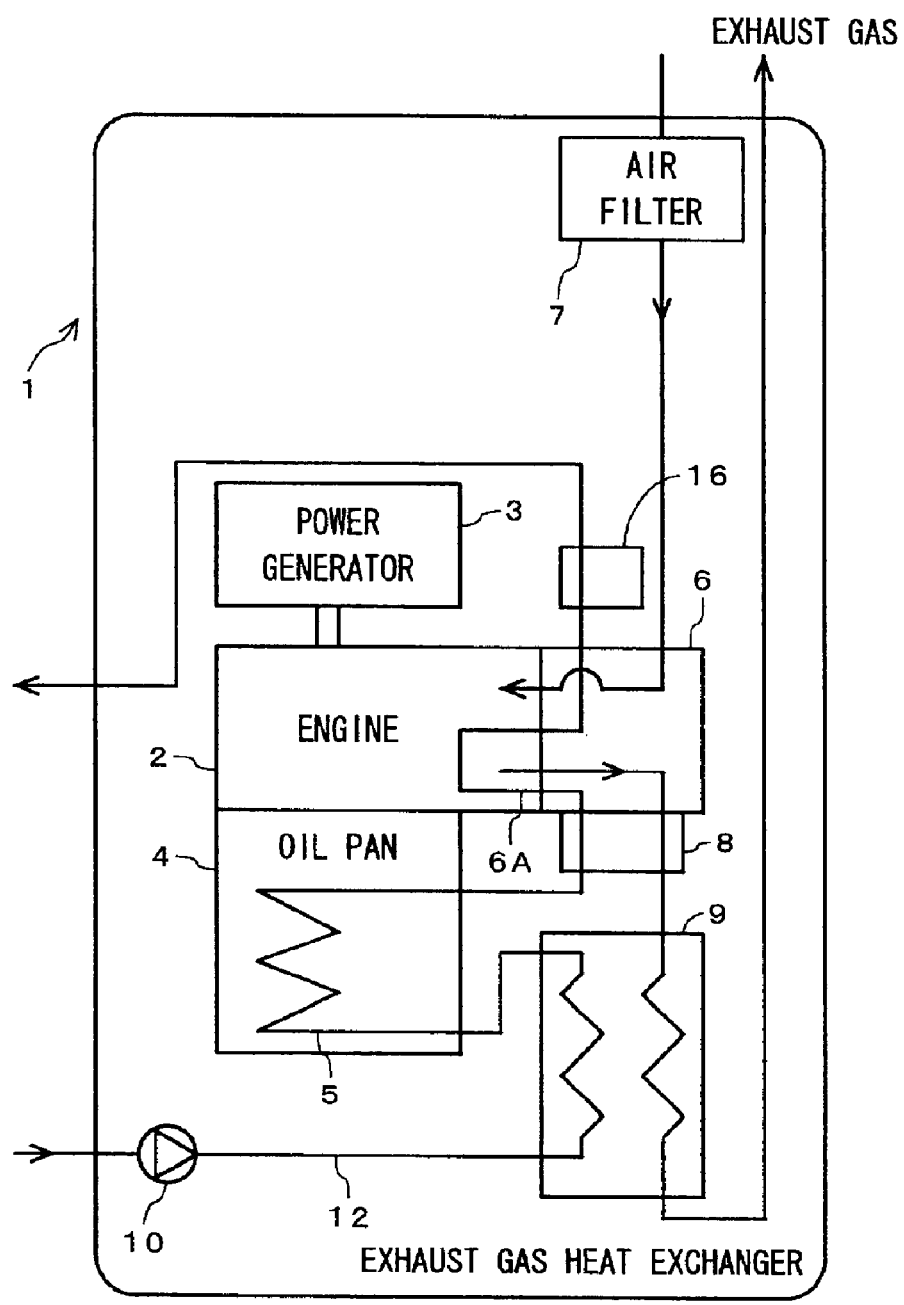
FIG. 1 is a block diagram showing a primary part of a waste heat recovering apparatus according to one embodiment of the present invention.

One embodiment of the present invention will be described in detail referring to the relevant drawings. Referring to FIG. 1, a waste heat recovering apparatus 1 installed in a cogeneration system is designed for recovering heat from the engine of an engine-driven power generator. The waste heat recovering apparatus 1 comprises the engine 2 and the power generator 3 mechanically connected to the engine 2. The power generator 3 generates an alternating current corresponding to the revolutions of the engine 2. The engine 2 is equipped with an oil pan 4 for storage of lubricant oil. The oil pan 4 includes an oil cooler (an oil heat exchanger) 5. The oil heat exchanger 5 transfers heat from the oil in the oil pan 4 to a heat transfer medium (a cooling water). A flow of air is introduced from an air filter 7 into a cylinder head 6 of the engine 2. An exhaust gas from the engine 2 passes through an exhaust manifold 8 and an exhaust gas heat exchanger 9 and then is discharged to the outside of the engine.

A circulation path 12 of the heat transfer medium is provided for effectively recovering the heat generated by the engine 2. A water pump 10 for circulating the heat transfer medium is mounted at the inlet of the circulation path 12. This arrangement in which the water pump 10 is disposed in the place where a temperature of the heat transfer medium is low allows other components such as seals to come into not direct contact with the heat transfer medium of a high temperature and hardly be degraded in the quality hence contributing to the longer operational life of the water pump 10. As the heat transfer medium is driven by the water pump 10, in the first place it is supplied to the exhaust heat exchanger 9, then it runs through the oil heat exchanger 5 in the oil pan 4, the engine 2, and the cylinder head 6 and passes after a thermal cover 16 to a thermal load which will be described later in more detail. The thermal cover 16 may contain a built-in thermostat to shut off the path and block the flow of the heat transfer medium when the temperature is lower than a predetermined level.

As the heat transfer medium is circulated along the circulation path 12, it recovers heat generated by the engine 2 and transfers it to the thermal load. More particularly, when the heat transfer medium recovers heat efficiently through heat exchange with the exhaust gas from the engine 2 by supplying the medium to the exhaust heat exchanger 9 while its temperature is remained low. Then the heat transfer medium is fed into the oil heat exchanger 5 in the oil pan 4, it draws heat of the oil received from the engine 2 and cools down the oil. The heat transfer medium is then passed to the exhaust gas heat exchanger 9 where it receives heat from the exhaust gas released from the engine 2. The heat transfer medium increased in the temperature by passing through both the exhaust heat exchanger 9 and the oil heat exchanger 5 in this order is further passed through a pass or a water jacket 6A provided as an engine cooling scheme in the cylinder wall and the cylinder head 6 and hence draws more heat, increasing its temperature to a higher level.

Figure 2:
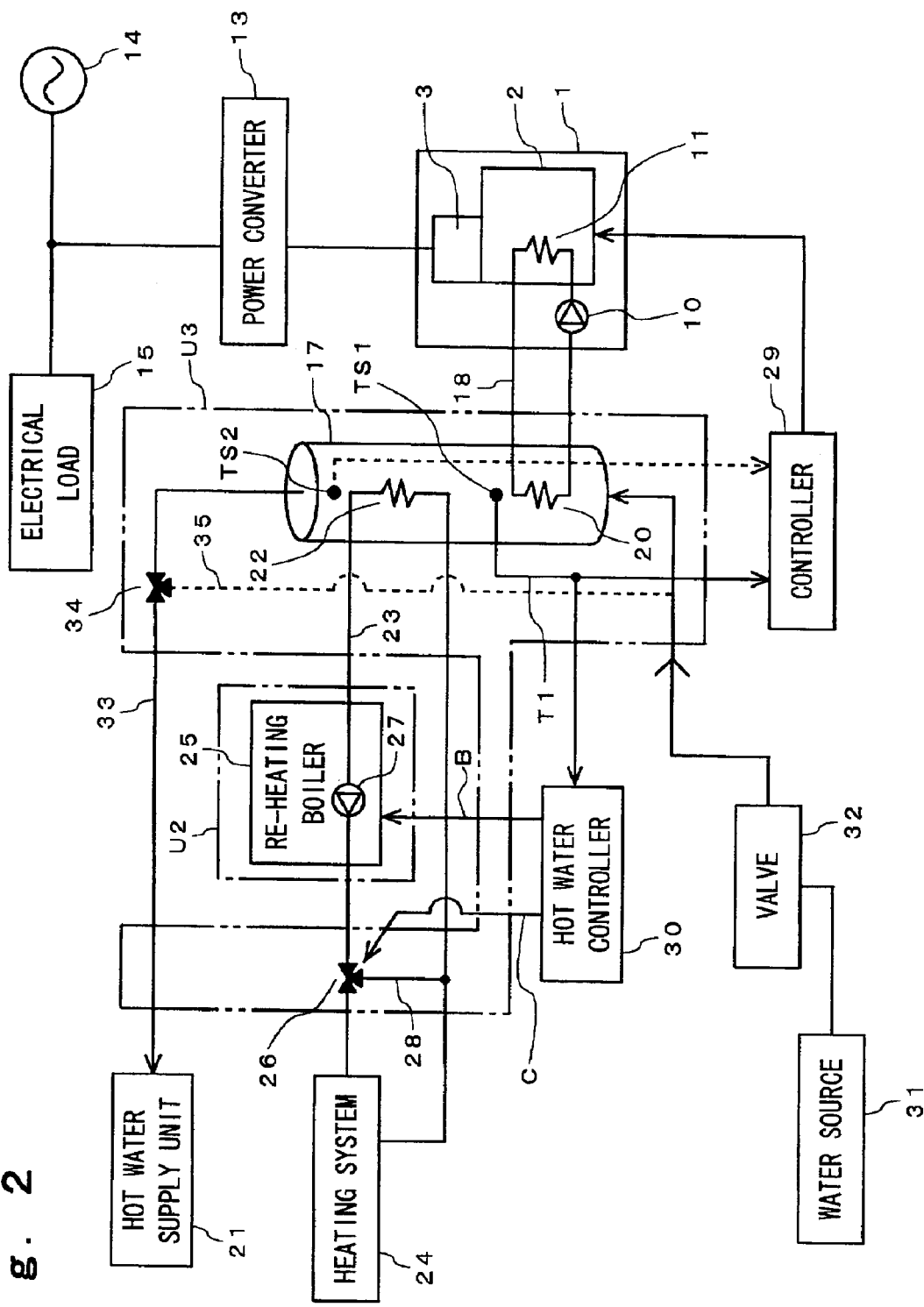
FIG. 2 is a block diagram showing an arrangement of a cogeneration system which includes a waste heat recovering apparatus according to embodiment of the present invention.

FIG. 2 illustrates an arrangement of a cogeneration apparatus having the engine power generator in its power generator section interconnected to a commercial power supply system.

A power converter 13 has a function of converting the AC output generated by the power generator 3 to an AC current of which the characteristics (of voltage, frequency, noise, etc.) are identical to those of the commercial power supply system and developing synchronization of the phase with the commercial power supply system. More particularly, the power converter 13 comprises a converter for converting the AC output released from the power generator 3 into a DC output, an inverter for inverting the DC output of the converter into an AC form which is identical in the frequency and the voltage to an input from the commercial power supply system, and other functional means including noise filters and interconnecting switches. An example of the power converter interconnected with the other (commercial) systems is disclosed in Japanese Patent Examined Publication (Hei) 4-10302. The AC output generated by the power generator 3 and converted by the power converter 13 is then supplied to an electrical load 15, which is also connected with the commercial power supply system 14.

The heat generated by the engine 2 for driving the power generator 3 is collected through a thermal exchange operation of a water cooling device and heat exchange unit (indicated generally by numeral 11) of exhaust gas heat exchanger 9 or the like. The cooling water which collects heat at heat exchange unit 11 is passed into a hot water storage tank 17 throughout a conduit 18 as used as a medium for carrying the heat to the hot water storage tank 17. The hot water storage tank 17 contains a output heat exchanger (referred to as a first heat exchanger hereinafter) 20 communicated with the conduit 18. The water supplied from a water source 31 to the hot water storage tank 17 is then heated by the first heat exchanger 20 to turn to a hot water. The hot water heated and saved in the hot water storage tank 17 is fed for further use to a hot water supply unit 21, which is a first thermal load.

A valve 32 is provided on a water pipe between the water source 31 and the hot water storage tank 17. The valve 32 is opened for supplying the water when the hot water in the hot water storage tank 17 decreases to below a predetermined level. The pump 10 which starts operating in synchronism with the engine 2 may automatically be switched off after a preset length of time (determined by a timer) since the engine 2 stops.

A second heat exchanger 22 is provided above the first heat exchanger 20 in the tank 17. The second heat exchanger 22 is communicated to a conduit 23, which in turn connected with a heating system 24, such as a central heating system or a floor heating system, acting as a second thermal load. The second conduit 23 forms a second hot water path, which is separated from the hot water path for supplying the hot water from the hot water storage tank 17 to the hot water supply unit 21. The second hot water path 23 performs secondary exchange of the heat from the hot water storage tank 17 thus increasing the efficiency of the heat recovery.

The second heat exchanger 22 is located at a position higher than the first heat exchanger 20 because the hot water heated by the first heat exchanger 20 has a higher temperature and convectively flows upwardly from the first heat exchanger 20. This allows the second heat exchanger 22 to take up more thermal energy from the hot water moved upward by the effect of convection.

In the second hot water path 23, there are also provided a re-heating boiler 25 and a three-directional valve 26. The re-heating boiler 25 is provided with a pump 27 for circulating the hot water throughout the second hot water path 23. The three-directional valve 26 is a means for switching the flow of the hot water to a bypass 28 or to the heating system 24. The following passages are selected by operating the three-directional valve 26. When the three-directional valve 26 is switched to the heating system 24, the passage is opened for conveying the hot water via the re-heating boiler 25 and the heating system 24 from and to the hot water storage tank 17. When the three-directional valve 26 is switched to the bypass 28, the passage is opened for conveying the hot water via the bypass 28, not the heating system 24, from and to the hot water storage tank 17.

A temperature sensor TS1 is provided in the hot water storage tank 17 and information about the temperature TI of the hot water measured by the temperature sensor TS1 is transmitted to a controller 29. The temperature sensor TS1 may be located at an appropriate height level between substantially the uppermost of the first heat exchanger 20 and the lowermost of the second heat exchanger 22 and most preferably at a midway between the first heat exchanger 20 and the second heat exchanger 22. It is very likely that, due to the effect of convection, the temperature of the hot water is lower at substantially the lowermost of the hot water storage tank 17 and higher at substantially the uppermost. As the temperature sensor TS1 is located at the midway, it can detect an average value of the temperature in the hot water storage tank 17.

In response to the temperature information TI, the controller 29 controls the start and stop operation of the engine 2. Since the temperature information TI represents the demand of heat from the hot water supply unit 21 which draws the hot water directly from the hot water storage tank 17 or from the heating system 24 which draws the hot water indirectly via the second heat exchanger 22, the controller 29 judges that the demand exceeds when the temperature information TI is not higher than a reference level Tref-1 and drives the engine 2 to generate the heat. On the other hand, when the temperature information TI is higher than the reference level Tref-1, the controller 29 judges that a sufficient level of the heat energy is saved in the hot water storage tank 17 and stops the operation of the engine 2.

The reference level Tref-1 of the temperature is determined from multiple parameters of the type and the magnitude of the thermal load (i.e. the type and the capacity of the hot water supply unit 21 and the heating system 24), the thermal output of the heat exchange unit 11, the volume of the hot water storage tank 17, and so on. The reference level Tref-1 has a hysteresis for ensuring a stable operation of the engine 2, i.e. avoiding frequent start and stop operations.

In case that the engine 2 is controlled with the temperature information TI, its operation may be contemplated for driving the power generator 3 to generate a constant power output or, in an electrical load dependent mode, to generate a variable output depending on the magnitude of the electrical load 15. In the constant power output mode, the engine 2 as a driving power source is operated to make the number of its revolutions constant and thus its operation will ensure a higher level of the efficiency minimizing the consumption of fuel and releasing an acceptable level of the exhaust gas. If the demand of electricity exceeds the output of the power generator 3, a deficiency in the electricity is covered by the supply from the commercial power supply system 14.

The temperature of the hot water in the hot water storage tank 17 is significantly varied depending on the consumption of the hot water, i.e. the demand of thermal energy, and the mode of the operation of the engine generator 10, e.g. either the constant output mode or the electrical load dependent mode. For example, in a system where when the consumption of the hot water is low, the temperature of the hot water can be maintained to about 80° C. with the power generator 3 operating in response to the temperature detected by the temperature sensor TS1, either abrupt, bulky consumption of the hot water resulting from the demand of heat given simultaneously from both the hot water supply unit 21 and the heating system 24 or the startup of the system may cause the temperature of the hot water in the hot water storage tank 17 to drop down to as a low degree as of the cool water supplied.

In case that the reference temperature of the hot water in the hot water storage tank 17 is hardly maintained with the heat collected from the engine 2, the re-heating boiler 25 functions effectively. The hot water controller 30 provides the re-heating boiler 25 and the three-directional valve 26 with a command "B" for re-heating and a command "C" for switching, respectively. The hot water controller 30 is preset with a lower reference temperature Tref-L which is lower than the reference temperature Tref-1 and when the temperature T1 of the hot water in the hot water storage tank 17 drops down to lower than the lower reference temperature Tref-L, it turns on the re-heating command "B" and the switching command "C". As the re-heating command "B" is turned on, the re-heating boiler 25 starts operating. As the switching command "C" is turned on, the three-directional valve 26 shifts its passage to the bypass 28. Accordingly, the hot water heated by the re-heating boiler 25 circulates through the conduit 23 and increases the temperature of the hot water in the hot water storage tank 17 via the second heat exchanger 22.

When the temperature of the hot water in the hot water storage tank 17 exceeds the lower reference temperature Tref-L, the re-heating command "B" and the switching command "C" are turned off to stop the operation of the re-heating boiler 25 and switch the three-directional valve 26 to the heating system 24 for the heating operation. The lower reference temperature Tref-L may have a hysteresis analogous to that of the reference temperature Tref-1.

As mentioned above, when the three-directional valve 26 has been switched to the bypass 28 responding to hot water supplying demand, the supply of the hot water to the heating system 24 stops. When the demand of the hot water supply unit 21 is to deliver the hot water to a bath or a kitchen, such delivery is rarely continued for an extensive length of time and thus stopping the supply of the hot water to the heating system 24 is also within only minutes. Accordingly, stopping duration of hot water circulation to the heating system 24 is also remains short. On the other hand, in the heating system 24 acting as the thermal load, the variation in the demand of the heat is rather moderate once the temperature in the room to be heated has risen up to its desired degree. Accordingly, since the temperature in the room seldom drops down extremely low with stopping of hot water circulation, there may unlikely be the occurrence of any problem in the practice.

Moreover, when the demand of the heat at the heating system 24 increases, the re-heating boiler 25 is turned on with the three-directional valve 26 switched to the heating system 24 thus to readily support the heating system 24 with a sufficient supply of the hot water. Increase of the demand of the heat at the heating system 24 may be judged based on a desired temperature preset in the heating system 24. It is also possible to have the three-directional valve 26 variable in the opening for returning at least a part of the hot water in the conduit 23 to the second heat exchanger 22 instead of switching of the entire flow of the hot water with the three-directional valve 26.

Figure 3:
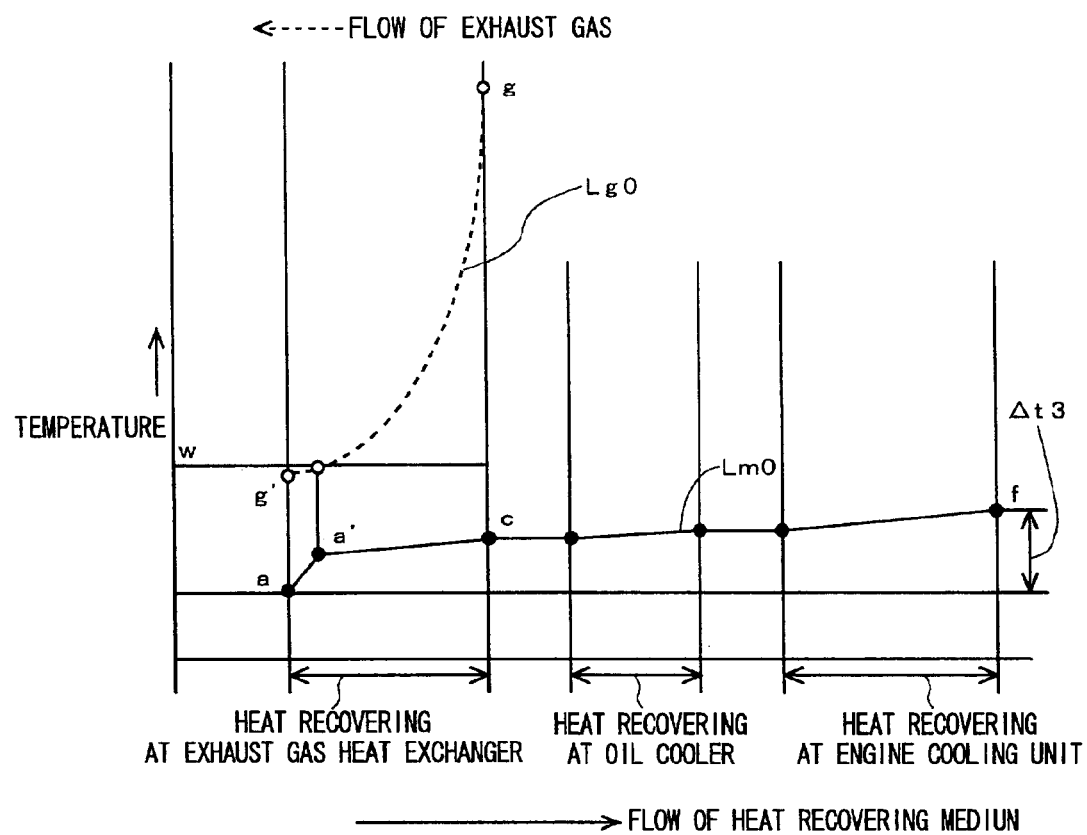
FIG. 3 is a graphic diagram showing changes in the temperature of a heat transfer medium and an exhaust gas.

In the exhaust gas heat exchanger 9, when the temperature of the exhaust gas is adjusted to lower than the dew point W of contents of the exhaust gas with an exhaust (gas) temperature detecting means provided between the inlet and the outlet, the recovery of condensation heat may be carried out with a higher efficiency. FIG. 3 illustrates a change in the temperature of the heat transfer medium between the inlet of the exhaust gas heat exchanger 9 and the cylinder head 6. As shown, the temperature of the heat transfer medium varies as is denoted by the curve Lm0 while the temperature of the exhaust gas varies as is denoted by the curve Lg0. The exhaust gas heat exchanger 9 is of a counter-flow type where the heat transfer medium and the exhaust gas flow in opposite directions with each other. In the figure, the directions of flow of the heat transfer medium and the exhaust gas are opposite to each other.

The exhaust gas having a temperature g at the heat transfer medium outlet or the exhaust gas inlet of the exhaust gas heat exchanger 9 drops down to a level g' lower than its dew point W at the heat transfer medium inlet or the exhaust gas outlet of the exhaust gas heat exchanger 9. In turn, the heat transfer medium introduced into the exhaust gas heat exchanger 9 draws the condensation heat of the exhaust gas and its temperature is sharply increased from a to a' within a short period of time. A gradient of the temperature increase (a–a') of the heat transfer medium across the exhaust gas heat exchanger 9 depends largely on the amount of flow and the initial temperature (a) of the heat transfer medium. The greater the flow of the heat transfer medium or the lower the initial temperature of the heat transfer medium, the more the gradient is acute.

This embodiment allows the heat transfer medium to be first received by the exhaust heat exchanger 9 when introduced into the exhaust heat recovering apparatus 1. Accordingly, as the heat transfer medium when remains low in the temperature receives heat from the exhaust gas in the exhaust heat exchanger 9, its gradient aa' becomes favorably steep.

While receiving heat from the exhaust gas at a high temperature exceeding the dew point W, the heat transfer medium is gradually increased in the temperature as expressed by the moderate gradient a'c as compared with the steep gradient aa'. The heat transfer medium heated up to a temperature c receives heat again from the oil cooler 5 and then from the cooling section of the engine 2 before is discharged at a degree f of the temperature from the exhaust heat recovering apparatus 1. As a result, the heat transfer medium yields a difference Δt3 of the temperature during a period from its introduction into the exhaust heat exchanger 9 to its discharge from the cooling section of the engine 2.

For example, as measured along the circulating path, the temperature of the heat transfer medium is 75° C. at the inlet of the exhaust heat exchanger 9, 78° C. at the inlet of the oil pan 4, 78.5° C. at the outlet of the same, and 85° C. at the outlet of the water jacket 6A. In a normal operation, the engine oil has to be held at substantially 90° C. As apparent from the above description, the engine oil can effectively be cooled down with the heat transfer medium transferred from the exhaust heat exchanger 9 to the oil cooler 5.

For efficiently recovering heat from the exhaust gas by means of transfer of the condensation heat of the contents of the exhaust gas, it is desired to control the flow and/or the temperature of the heat transfer medium to such a level that the temperature of the exhaust gas released from the exhaust gas heat exchanger 9 remains lower than the dew point W. With the initial temperature of the heat transfer medium at (the inlet of) the exhaust gas heat exchanger 9 set to a fixed level, when the flow of the heat transfer medium is large, the efficiency of the transfer of heat from the exhaust gas is increased. If the flow is smaller the efficiency of recovering heat from the exhaust gas is declined. Once the temperature required at the thermal load or the magnitude of the thermal load has been determined, the target flow of the heat transfer medium is preset in combination with the temperature of the heat transfer medium corresponding to the thermal load magnitude so that the temperature of the exhaust gas remains lower than the dew point W. The target flow may be calculated through experiments. The calculated target of the flow can be realized by controlling the revolutions of the water pump 10.

If the requirement temperature or target temperature of the thermal load is too high, that temperature may fail to be gained with the flow target of the transfer medium which is determined so that the temperature of the exhaust gas remains lower than the dew point W. For compensation, the flow of the heat transfer medium shall be reduced for increasing its temperature at the entrance of the heat exchanger 9 and thus decreasing the recovery of the condensation heat. Even in that case, it is desired that the overall operating duration of the apparatus includes a longer period of the operation in which the flow target of the heat transfer medium which is determined so that the temperature of the exhaust gas remains lower than the dew point W.

Alternatively, with the flow of the heat transfer medium set to a fixed rate, the temperature of the exhaust gas can be reduced to lower than the dew point W by adjusting the entrance temperature thereof. First, a reference level Tw of the entrance temperature is determined so that the temperature of the exhaust gas remains lower than the dew point W. If the entrance temperature exceeds the reference level Tw and the efficiency of the recovery of heat is declined, the engine 2 is stopped. As the engine 2 has stopped and the entrance temperature drops down to lower than the reference level Tw, the engine 2 is restarted. By this manner, the entrance temperature of the heat transfer medium can be maintained to the reference level Tw, hence allowing the recovery of heat at a higher efficiency. Preferably, a temperature sensor for measuring the entrance temperature is provided at the inlet of the exhaust gas heat exchanger 9. Alternatively, the temperature sensor may be mounted, across the circulation path of the heat transfer medium, at the upstream side of the water pump 10 or closely before or after the cylinder head 6.

Start and stop operation of the engine 2 maybe controlled by determining a reference level Tref-1 of the temperature information T1. More specifically, the relationship between the entrance temperature and the temperature information T1 of the heat transfer medium is predetermined and used for setting the reference level Tref-1 in relation to the reference level Tw. When the engine 2 starts and stops according to whether the entrance temperature is lower than the reference level Tref-1 of the temperature information, the temperature of the exhaust gas can be maintained lower than the dew point W.

If the temperature level required at higher thermal load with the reference temperature Tw of the heat transfer medium determined so as to maintain the temperature of the exhaust gas lower than the dew point W, required temperature level may hardly be obtained. In this case, the reference level Tw of the entrance temperature of the heat transfer medium is set relatively high to obtain such temperature level. Such an increased value of the reference temperature Tw should be determined through experiments, provided that the requirement at the thermal load is satisfied without significantly declining the efficiency of the transfer of heat throughout the operating duration which includes a period in which the temperature of the exhaust gas is kept higher than the dew point W. The same may result when timing of start and stop of the engine 2 is controlled by adjusting the hysteresis of the reference temperature Tref-1.

In case that a hot water tank 17 is provided, it is desired to maintain the temperature of hot water in the tank 17 to a particular level corresponding to the requirement at the thermal load. Assuming that the operation of the engine 2 is stopped when the temperature information T1 received from the temperature sensor TS1 is higher than the reference level Tref-1, the flow of the heat transfer medium can be determined in consideration of the operating conditions of the engine 2. More particularly, when the starting and stopping control of the engine 2 is proceeded to maintain the temperature of the hot water equal to the reference level Tref-1, the result of the operating conditions is utilized to calculate the amount of the waste heat released from the engine 2 through experiments and the flow of the heat transfer medium relative to the amount of the waste heat is thus determined so that the temperature remains not exceeding the reference level Tw. Accordingly, while the flow is fixed, the temperature of the heat transfer medium can be maintained to the reference level Tw through turning on and off the engine 2 hence allowing the temperature of the exhaust gas to remain lower than the dew point W.

In case that the temperature of the exhaust gas is maintained lower than the dew point W on the basis of the temperature of the heat transfer medium, like the case that the temperature of the exhaust gas is maintained lower than the dew point W on the basis of the flow of the heat transfer medium, it is desired to determine the temperature of the heat transfer medium so that the overall operating includes a longer period of the time when the temperature of the exhaust gas remains lower than the dew point W.

The controlling manner is not limited to the case in which one of the flow and the temperature of the heat transfer medium is controlled while the other is fixed but may be carried out with both the flow and the temperature being variable. In brief, the thermal energy of the heat transfer medium to be introduced into the exhaust gas heat exchanger 9 can favorably be controlled to such a level that the transfer of heat from the exhaust gas loaded into the exhaust gas heat exchanger 9 is most efficiently performed while satisfying the requirement at the thermal load.

It may also be possible to measure directly the temperature of the exhaust gas and determine the temperature and the flow of the heat transfer medium so that the temperature of the exhaust gas is converged to a reference level, instead of detecting and controlling the temperature and the flow of the heat transfer medium to their reference levels, for maintaining the temperature of the exhaust gas to lower than the dew point w. In that case, temperature sensors for measuring the temperature of the exhaust gas are provided in the exhaust gas heat exchanger 9 and at the upstream or downstream side of the same (preferably adjacent to the outlet of the exhaust gas).

Figure 5:
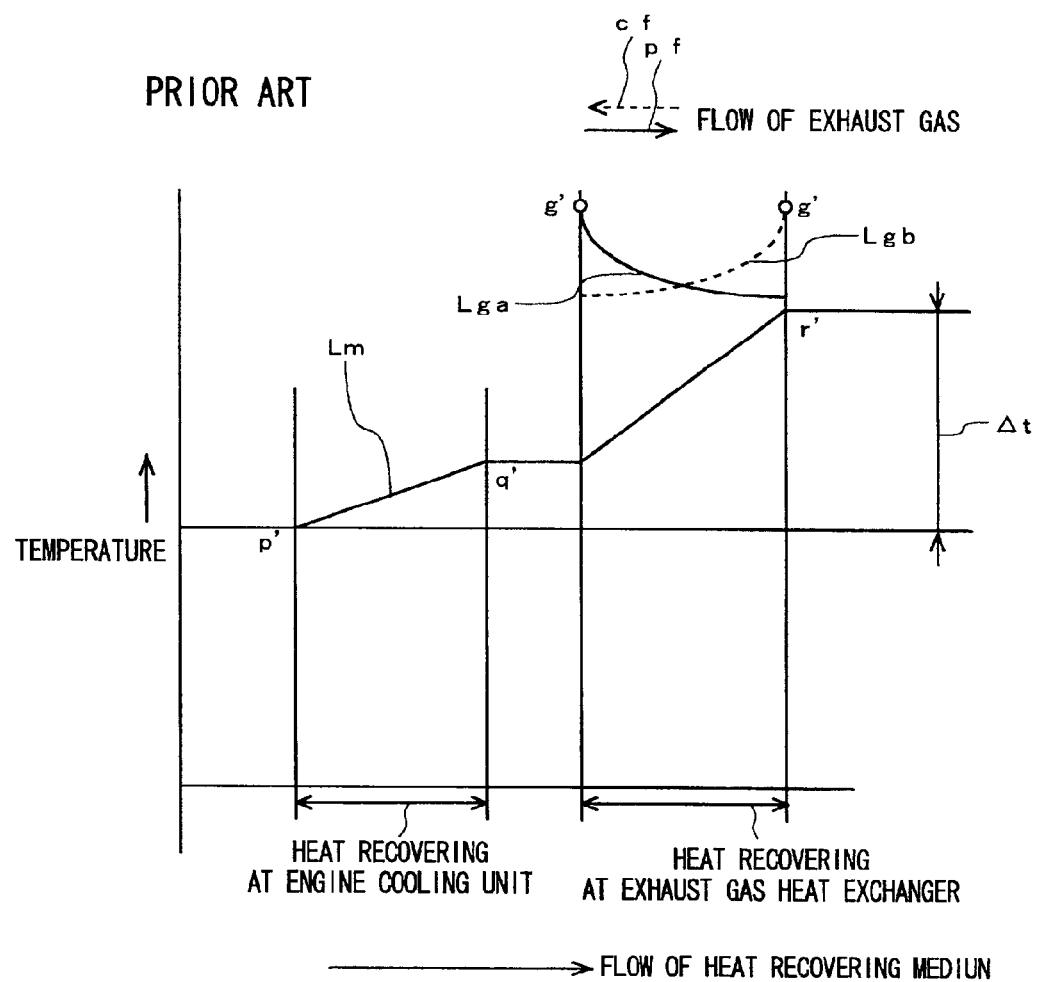
FIG. 5 is a graphic diagram showing changes in the temperature of a heat transfer medium and an exhaust gas in a prior art.
Figure 6:
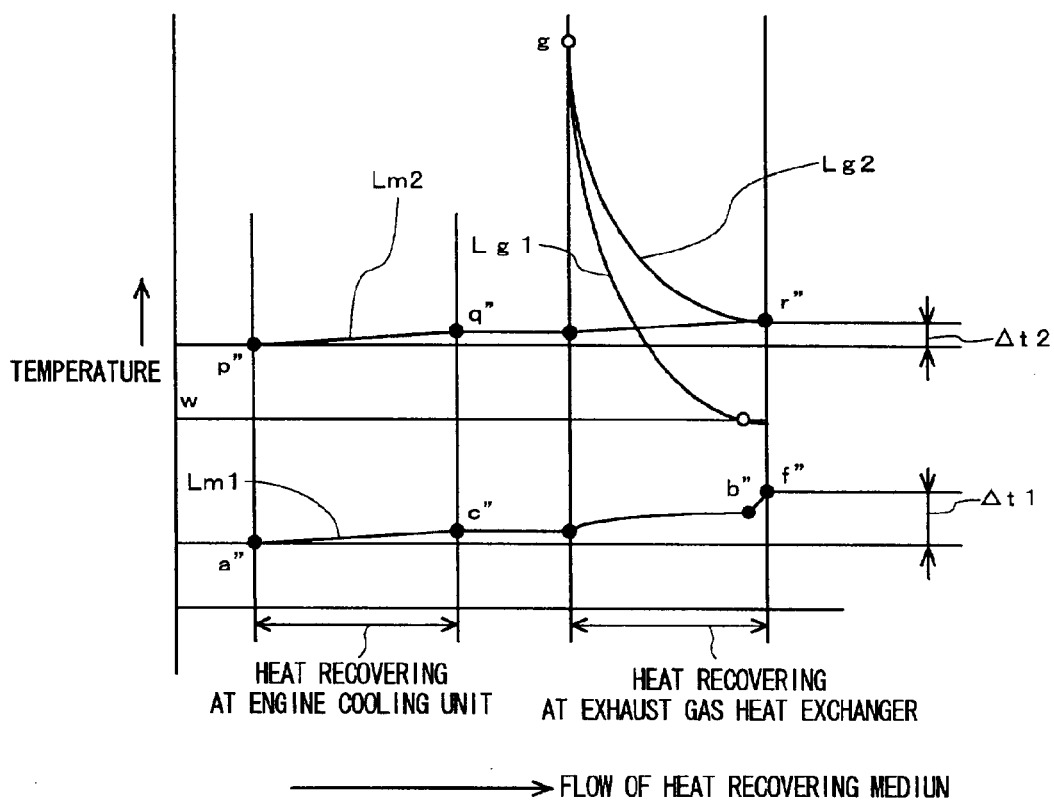
FIG. 6 is a graphic diagram showing changes in the temperature of a heat transfer medium and an exhaust gas in another prior art.

As described, the flow and the temperature of the heat transfer medium at the entrance of the exhaust gas heat exchanger 9 are controlled to maintain the temperature of the exhaust gas lower than the dew point W in the exhaust gas heat exchanger 9, whereby the efficiency of transferring the condensation heat from the exhaust gas to the heat transfer medium can successfully be increased. Finally, the temperature increase (a temperature difference $\Delta t3$) of the heat transfer medium by the heat received is higher than that of the conventional apparatus shown in FIG. 5. Particularly when the temperature of the heat transfer medium to be introduced into the exhaust gas heat exchanger 9 is lower than the dew point W of the exhaust gas, the above effect will be enhanced by feeding the heat transfer medium to the exhaust gas heat exchanger 9 prior to the engine cooling unit.

Figure 4:
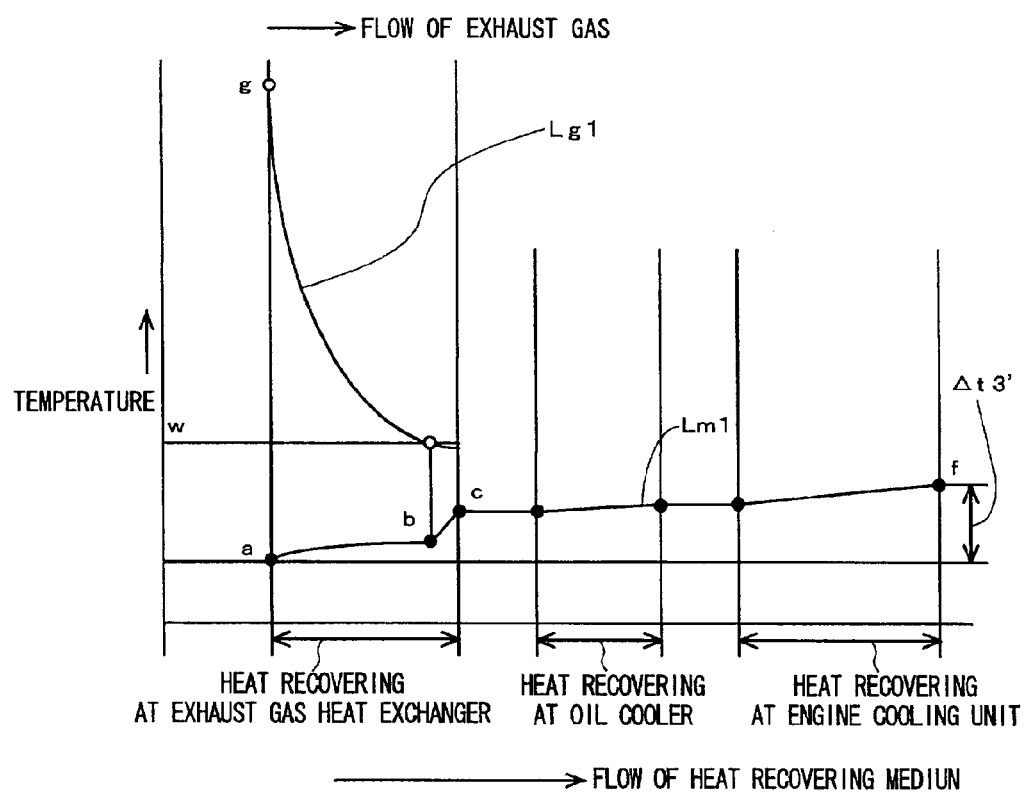
FIG. 4 is a graphic diagram showing changes in the temperature of a heat transfer medium and an exhaust gas in a waste heat exchanger of a parallel-flow mode.

Although the exhaust gas heat exchanger 9 of the embodiment is of a counter-flow type, it may be implemented by a parallel-flow type with equal success. FIG. 4 illustrates a temperature profile of the heat transfer medium between the inlet of the exhaust gas heat exchanger 9 of a parallel-flow type and the cylinder head 6. The temperature of the heat transfer medium varies when it is lower at the entrance of the exhaust gas heat exchanger 9 than the dew point W of the exhaust gas as is denoted by the curve Lm1, while the temperature of the exhaust gas varies as is denoted by the curve Lg1.

As shown, the heat transfer medium having a temperature a is introduced into the exhaust gas heat exchanger 9 and it draws heat from the exhaust gas having a temperature g hence gradually decreasing the temperature of the exhaust gas. Upon the temperature of the exhaust gas dropping down to the its dew point W (the heat transfer medium heated up to a temperature b), the content of the exhaust gas is condensed thus releasing the condensation heat and increasing the temperature of the heat transfer medium at a sharp gradient (denoted by the line bc). Finally, the temperature difference of $\Delta t3'$ can be achieved. Similar to the counter-flow type, the gradient is determined by the flow and the temperature (at the level a) of the heat transfer medium to be introduced into the exhaust gas heat exchanger 9. The greater the flow or the lower the temperature of the heat transfer medium, the more the gradient becomes sharp. This will equally be accomplished with not only the parallel-flow type or the counter-flow type of the heat exchanger but also a orthogonal-flow type or their modification.

In the embodiment, the oil heat exchanger 5 is also employed for recovering heat from the oil in the oil pan 4. This is effective particularly when the temperature of the heat transfer medium can be increased with difficulty such as in very cold regions. While the oil heat exchanger 5 enables to effectively reduce the temperature of the oil, it may be omitted depending on the conditions of an installation site.

As set forth above, the present invention defined in any of claims 1 to 4 allow heat generated on the engine to be recovered at high efficiency. In particular, as the heat transfer medium is received by the exhaust heat exchanger when its temperature remaining at a minimum degree, it can most favorably recover latent heat from the exhaust gas. The recovery of heat can be improved in the efficiency thus reducing the running cost of the apparatus.

At the starting of the engine in cool conditions, heat recovered by the exhaust heat exchanger is readily distributed to warm up the engine oil. As the engine oil is rapidly increased in the temperature for shifting to the normal operation, power loss by the friction of the engine oil can be minimized.

The present invention defined in claim 3 allows the temperature of the heat transfer medium can be risen while maintaining the efficiency of the heat recovery action high. Because the operation includes controls in which a temperature and/or a flow rate of the heat transfer medium are controlled so as to decline the temperature of the water vapor in the exhaust gas lower than its dew point, for use the heat of condensation.

The present invention allows the water pump to be increased in the operating life for circulating the heat transfer medium.

What is claimed is:

1. An engine exhaust heat recovering apparatus for providing a heat output through a heat transfer medium circulated by the action of a water pump across a cooling section of the engine and an exhaust heat exchanger which heat source is provided with the heat generated in the exhaust gas of the engine, comprising:

an oil heat exchanger for heat exchange between the engine oil in the engine and the heat transfer medium, disposed between the cooling section of the engine and the exhaust heat exchanger, wherein the exhaust heat exchanger is disposed at an upstream side of the cooling section of the engine, the heat output is taken out with the heat transfer medium at a downstream side of the cooling section of the engine; and the temperature and/or the flow of the heat transfer medium is determined to maintain the temperature of water vapor in the exhaust gas to be not higher than the dew point during the operation in the heat exchanging action of the exhaust heat exchanger.

2. An engine exhaust heat recovering apparatus according to claim 1, wherein the heat transfer medium is predetermined in the temperature and/or the flow rate to have a temperature of the water vapor in the exhaust gas maintained at a temperature lower than the dew point through the heat exchange in the exhaust heat exchanger during a predetermined length of time in the operation.

3. An engine exhaust heat recovering apparatus according to claim 1, wherein the heat transfer medium is further transferred from the heat transfer medium circulating path to an output heat exchanger where heat is released from the heat transfer medium.

4. An engine exhaust heat recovering apparatus according to claim 1, wherein the water pump is disposed on the inlet side of the exhaust heat exchanger.

* * * * *